Feb. 18, 1930.    C. W. VOGT    1,747,338
PRESSURE RETAINING SYSTEM
Filed Dec. 25, 1919    2 Sheets-Sheet 2
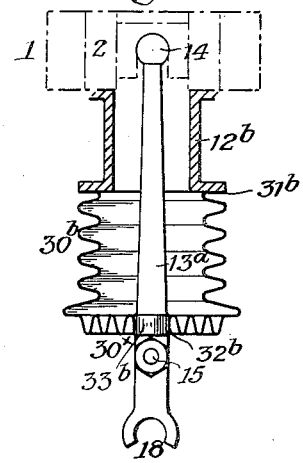
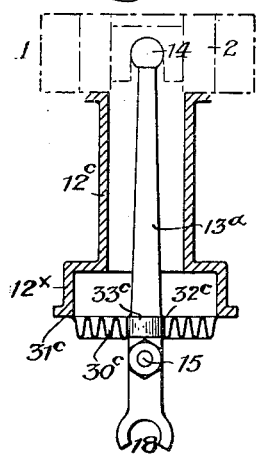
Inventor:

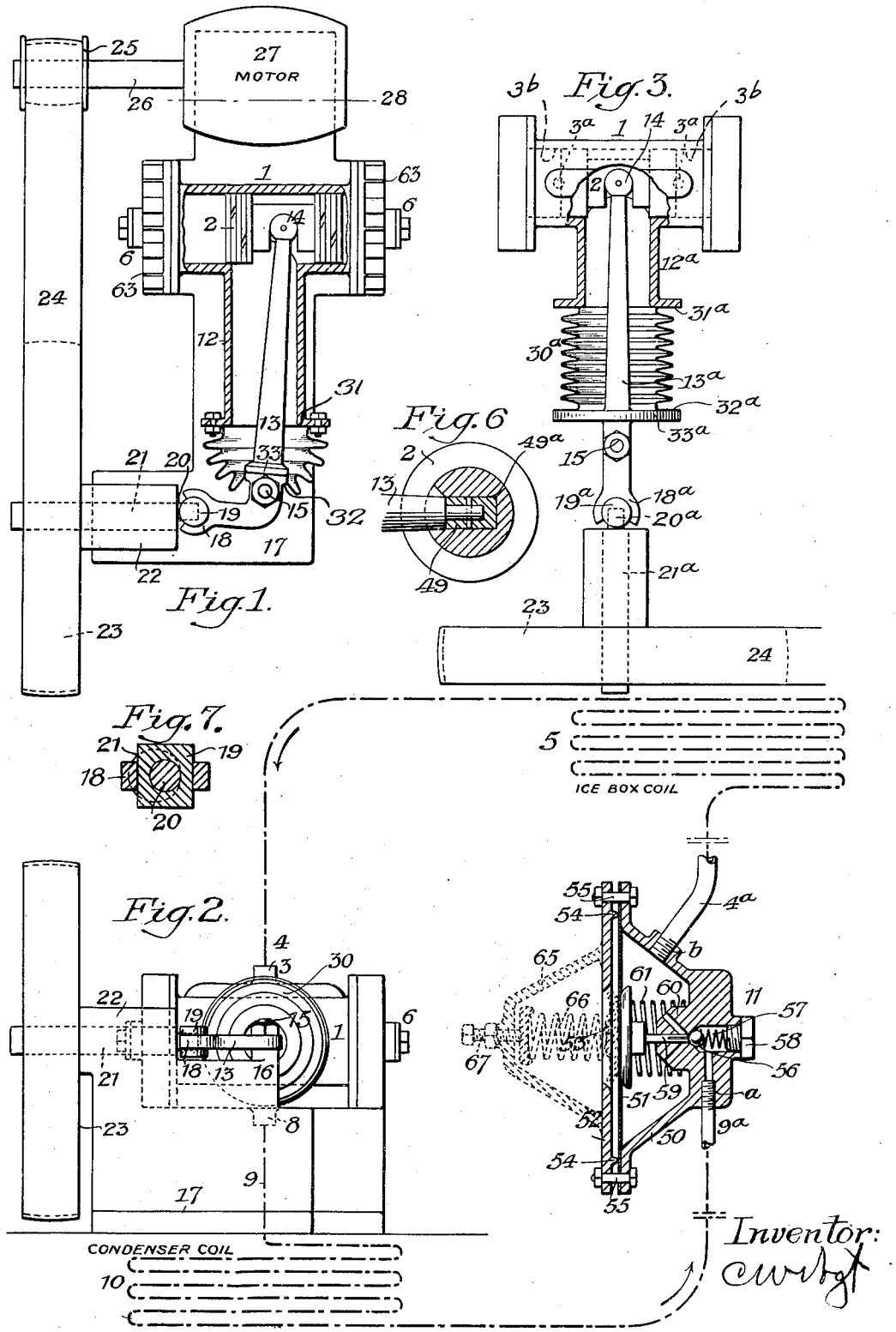

Patented Feb. 18, 1930

1,747,338

UNITED STATES PATENT OFFICE

CLARENCE W. VOGT, OF LOUISVILLE, KENTUCKY, ASSIGNOR, BY MESNE ASSIGNMENTS, TO FRIGIDAIRE CORPORATION, A CORPORATION OF DELAWARE

PRESSURE-RETAINING SYSTEM

Application filed December 25, 1919. Serial No. 347,252.

My invention relates to apparatus wherein fluid is confined under pressure, or where it is desired to create a vacuum, and while the features of my invention are available for use with different apparatus, I have found them particularly advantageous with household refrigerating plants employing a compressible refrigerant automatically circulated throughout the system and requiring compression to produce the desired refrigerating effect. My invention comprises means whereby I am enabled to prevent or avoid leakage in the system, while effecting the desired compression or creating the desired vacuum, without the necessity of employing packed joints in connection with the compressor cylinder.

In all cold producing plants wherein a compressor is employed, great difficulty has been experienced in maintaining tight joints to hold the refrigerant within the system. The usual practice is to pack the joints and stuffing-boxes with wicking, rod-packing, etc. It has also been proposed to provide oil-sealed stuffing boxes. All attempts to provide sufficiently tight joints by the use of packing, however, results in such an increased amount of frictional resistance as to greatly increase the amount of power required, and under the most favorable conditions packed joints will not remain tight for long periods of time without considerable attention. The difficulties attendant upon any attempt to pump oil through these joints results in the necessity of using further power and much additional mechanism.

The object of my invention is to avoid all of the difficulties attending the use of packed joints, of any nature, and my invention involves forming a pump housing or casing as an hermetically sealed container which encloses the moving parts of the pump, and providing said housing or container with a flexible portion through which suitable means for operating the moving parts extends and which is sealed to such operating means.

For this purpose I may employ a flexible casing such as a bellows sealed to the pump housing and to a rocking actuating rod or lever or other means for operating the piston, the diaphragm being connected to the oscillating rod or lever adjacent its pivotal connection. I may also arrange a flexible diaphragm substantially at right angles to the axis of the operating rod or lever, which may be connected to a flexible cylinder or to a cylindrical extension carried by the compressor.

In all instances, I provide a flexible shell, casing, or bellows which is preferably hermetically sealed to the pump housing and to one of the moving parts and which seals the operative connection for effecting movement of the piston; thereby avoiding the necessity of using any form of packed joint, oil-flooded joint, or other means for securing the desired seal.

Other features of my invention will be referred to hereinafter.

In the drawings:

Figure 1, is a plan view, more or less diagrammatic, of one form of pressure-retaining apparatus to which my invention may be applied; the same comprising a form of household refrigerating apparatus, shown partly in section.

Fig. 2, is an elevation of the structure shown in Fig. 1, including a diagrammatic showing of the piping of the refrigerating system and a controlling valve.

Fig. 3, is a diagrammatic plan view, similar to Fig. 1, showing another arrangement within the scope of my invention.

Figs. 4 and 5 are diagrammatic views illustrating further modified arrangements embodying my invention.

Fig. 6, is an enlarged view of the connection between the piston and its operating member, and Fig. 7 is an enlarged view of the connection between the power shaft or spindle and the piston operating member.

The apparatus shown in the accompanying drawings is of the type wherein the refrigerating medium is subjected to compression, passed to a condensing coil, and then returned to an evaporating or ice-box coil through a suitable controlling valve and, after being evaporated, is automatically returned to the compressor to be compressed and condensed.

In the drawings, 1 represents a compressor cylinder, having a reciprocating piston 2; such cylinder receiving the refrigerating medium from a suitable inlet 3 with which the return pipe 4 from the ice-box coil 5 communicates; the inlet 3 having ports $3^a$ opening into compression chamber $3^b$ in the compressor cylinder. At each stroke of the piston the compressed refrigerant is delivered through valved outlets 6 at the ends of the compressor cylinder, the valves automatically acting as check valves alternately, as the returning refrigerating medium is admitted to the cylinder at each end of the same alternately. At each stroke of the piston the compressed refrigerant is passed out of one end of the cylinder past one of the valves to a passage formed in the lower wall of the cylinder to a common outlet 8, communicating with a pipe 9 leading to the condenser coil 10. From the condenser coil the compressed refrigerant passes to the evaporating coil 5, through an automatic valve 11. It may be noted that the process is a continuous one.

The difficulty heretofore experienced in the operation of compressors of this type, is the inability to maintain a leak-proof joint around the piston rod or the means employed for operating the piston, and to overcome this difficulty I propose to omit the use of a piston rod, and to reciprocate the piston by means of a lever or other suitable form of oscillating member operatively connected thereto intermediate the ends of the piston; such operating element being enclosed in a housing having a flexible portion. The housing, together with any form of the flexible part employed, preferably forms an hermetically sealed container so that the desired pressure may be secured and maintained within the system during operation of the apparatus without danger of leakage. The flexible portion may be variously constructed. It may be in the form of a relatively flat member, or may be semi-spherical or cylindrical, and while it may be made of any metal suitable for the purpose, it is usually of copper. The flexible member is deeply corrugated or ribbed to an extent permitting the desired motion with the moving member operating the piston, well within the elastic limit of the metal employed. In nearly all instances the movement of the flexible partition is very slight and by employing deep corrugations I am enabled to secure the desired flexibility.

In the structure shown in Figs. 1 and 2, the cylinder 1 is shown as provided with a lateral extension 12 forming a low pressure chamber, midway the ends of the same, within which extension a lever 13 is disposed, connected to the piston at 14, and pivoted at 15 to a suitable support 16, carried by the base 17. In this arrangement I have shown a bell-crank lever; the long end being in operative engagement with the piston, while the short end is bifurcated at 18 for engagement by an operating element which in the present instance is a block 19 carried by an eccentric pin 20 at the end of a shaft or spindle 21, journaled in a suitable bearing 22; the opposite end of the shaft being provided with a pulley or fly wheel 23, driven by a belt 24, from a pulley 25 on the end of a shaft 26, driven by a suitable motor 27. The motor is preferably pivotally mounted with respect to the base on the line 28 so as to overhang slightly and keep the belt taut.

Between the end of the extension 12 and the pivotal connection 15 of the lever, I provide a flexible shell or casing 30. In the present instance, this shell or casing is hemispherical, and is preferably, though not necessarily, hermetically sealed, as by brazing, soldering, welding, or in any other approved manner, to the extension 12 at the point 31, and at 32 to the lever; the latter having a cylindrical portion 33 permitting such attachment. The cylinder 1, extension 12, and bellows 30 form an hermetically sealed pump or compressor housing. This hemi-spherical shell is deeply ribbed or corrugated as indicated, and constitutes a flexible partition. In such arrangement it will be noted that the slight movement imparted to the shorter arm of the bell-crank lever 13 by the eccentrically operated block 19 carried by the shaft 21 effects sufficient movement of the longer arm of said lever to reciprocate the piston in the compressor cylinder to the desired extent. In action, the movement of the lever will be transmitted to the flexible partition by reason of its connection therewith, and as such movement of the partition is well within the elastic limit of the metal composing the same, there is no danger of such movement affecting the metal or causing a break in the wall of the same. This sealing of the operating means for the piston with respect to the cylinder in which it operates, insures retention of the refrigerating medium within the system against all danger of leakage.

It will be understood that the disposition and character of the flexible shell or partition may be changed without departing from the spirit or scope of my invention, and in Figs. 3, 4, and 5, I have shown other forms and arrangements. In these arrangements, I have shown the use of a straight lever $13^a$, which will be rocked or oscillated to reciprocate the piston in substantially the same manner as the lever shown in Figs. 1 and 2, that is to say the driven shaft $21^a$ is provided with an eccentric pin $20^a$, having a block $19^a$ engaging the bifurcated end $18^a$ of the short arm of the lever.

In the arrangement shown in Fig. 3, the extension $12^a$ at the side of the cylinder is much shorter than that shown in Figs. 1 and 2, and the elastic partition is in the form of a flexible cylinder 30$^a$, sealed to the extension at 31$^a$, and at 32$^a$ to a boss or flange 33$^a$ carried by the lever 13$^a$. In the arrangement shown in Fig. 4, a flexible partition, cylindrical in form, is shown at 30$^b$, with an elastic or flexible end 30$^x$, integral therewith; the cylindrical portion 30$^b$ being sealed at 31$^b$ to the extension 12$^b$, while the elastic or flexible end 30$^x$ is sealed at 32$^b$ to a shoulder or boss 33$^b$ of the lever 13$^a$, adjacent its pivotal connection.

In Fig. 5, I have shown the compressor cylinder with an extension 12$^c$ having a belled end 12$^x$, to which a substantially flat diaphragm 30$^c$ is hermetically sealed at 31$^c$. This diaphragm is deeply ribbed or corrugated and is sealed at 32$^c$ to a shoulder 33$^c$ of the lever 13$^a$.

Fig. 6 is an enlarged view of the connection between the piston and the lever for operating the same. At the end of the lever I mount a hardened block 49, preferably of disk form, which is adapted to a seat 49$^a$ in the piston; the shape of the block insuring reciprocative movements of the piston without danger of the same turning. The block is carried by a stem at the end of the lever, and it may be pinned thereto, as shown in the drawing. Fig. 7, shows an enlarged sectional view of the connection between the operating shaft and the lever, of the form of structures shown in Figs. 1, 2, 3, 4 and 5, the lever being provided with a bifurcated end disposed in operative engagement with a cylindrical block 19 carried by and movable with respect to the eccentric pin at the end of the driving shaft or spindle.

The valve 11, shown in Fig. 2, is designed to control the passage of the compressed refrigerant from the condenser coil to the ice box coil, and is atmospherically operated. It may comprise a shell 50, suitably cupped, to which a diaphragm 51 may be secured by means of a disk 52, apertured at 53; such disk having an annular flange 54 engaging the diaphragm and being held to the casing by suitable bolts 55. The pipe 9$^a$ leading from the condenser coil is attached to the shell 50 at $a$, and the pipe 4$^a$ leading to the ice box coil is connected to said shell at $b$. To control the passage of the refrigerant, I may provide a ball valve 56, held to its seat by a light spring 57, assisted by the pressure from the condenser coil; the light spring being retained in place by a screw plug 58. The valve may be opened by the operation of a diaphragm operated stem 59, movable in the hub 60 of the shell; such stem being held in the normal position by a spring 61. When the pressures balance, the valve 56 is closed. As vacuum forms on the opposite side of the valve, the atmospheric pressure externally of the valve casing acts upon the diaphragm 51 and moves the same against the tension of the spring 61; which movement is communicated to the stem 59, and opens the valve 56 until sufficient of the compressed refrigerant from the pipe 9$^a$ has passed to the pipe 4$^a$ leading to the ice box coil to again balance the pressures, when the flow will be automatically cut off. The stem 59 is preferably grooved for the free passage of the refrigerant when the valve 56 is open. As long as the compressor is in action, the valve 11 will operate automatically to pass the refrigerant from the condenser coil to the ice box coil and maintain the desired degree of coldness.

The form of expansion valve shown by full lines, Fig. 2, while suitable for use with a refrigerant such as ethyl chloride, is not suitable for use with sulphur dioxide. To procure a sufficiently low boiling point for ethyl chloride, viz: 20° F., it is necessary to maintain a vacuum in the evaporating coils. Sulphur dioxide, however, will boil at this low temperature, slightly above atmospheric pressure. Hence, when the refrigerant employed boils at less than atmospheric pressure and at the desired temperature in the evaporator, the form of valve shown by full lines is available, but when a refrigerant is employed which boils at higher than atmospheric pressure (at the temperature required, i. e., 0° to 25° F.,) then an additional spring must be added to the opposite side of the diaphragm to counterbalance this additional pressure. An addition to the casing 50 for this purpose is shown by dotted lines at 65; such casing containing the additional spring indicated at 66, disposed in the usual manner, with an adjusting screw 67 for such spring, carried by the casing.

I claim:

1. The combination of a compressor cylinder having an opening in the side of the same, a double ended piston reciprocable within said cylinder, means for reciprocating said piston including an oscillating lever extending through the cylinder opening substantially at right angles to the piston and in operative engagement with the latter intermediate the ends of the same, a tubular extension carried by said compressor cylinder and enclosing the oscillating lever, a pivotal support for said lever disposed beyond the cylinder opposite its opening and located substantially midway the ends of the same, a circular boss carried by said lever, an elastic wall having one end hermetically sealed to the end of the tubular extension and its opposite end hermetically sealed to the circular boss of said lever; said wall being subject to movement by the latter whereby leakage past the piston may be trapped, and means for actuating said oscillating lever.

2. The combination of a compressor cylinder having an opening in the side of the same, a double ended piston reciprocable within said cylinder, a tubular extension integrally connected with said compressor cylinder and enclosing said side opening, a lever disposed within said tubular extension for reciprocating said piston, a pivotal support for the lever disposed beyond the tubular extension and located in axial alignment therewith and substantially midway the ends of the compressor cylinder, an elastic wall having one end hermetically sealed to the tubular extension and its opposite end hermetically sealed to the lever adjacent to its pivotal connection; said elastic wall being subject to movement by said lever, and rotating means for effecting oscillation of said lever.

3. In apparatus of the character described, the combination of a pump housing; a compression chamber in the housing; displacement means in the chamber; and driving means for the displacement means comprising a bellows sealed to the housing, a movable member extending through the bellows for moving the displacement means, said movable member being sealed to the bellows, and bearing means for the movable member exterior of the bellows.

4. In an apparatus of the character described, the combination of a sealed gas-tight housing, a compression chamber in the housing, displacement means for pumping gas under pressure from the compression chamber, and rocking means for transmitting power through the wall of the housing for operating said displacement means, said power transmitting means including a non-rotating flexible bellows secured gas-tight over an opening through said wall.

5. In an apparatus of the character described, the combination of a sealed gas-tight housing including a pump cylinder, a piston operating in the cylinder and means for transmitting power through the wall of the housing for operating the piston, said power transmitting means including a non-rotating flexible bellows secured gas-tight over an opening in a wall of the housing and a movable member extending through the bellows in a direction transverse to the axis of said piston and connected to the piston.

6. In apparatus of the character described, the combination of a pump housing; a compression chamber in the housing; displacement means in the chamber; and power transmitting means for the displacement means comprising a rocking actuator extending through the housing, and a non-rotating bellows surrounding the actuator and sealed to the housing and to the actuator, said bellows partaking of rocking movement with the actuator.

7. In apparatus of the character described, the combination of a pump housing; a compression chamber in the housing; displacement means in the chamber; and power transmitting means for the displacement means comprising a rocking actuator having a pivot bearing and extending through the housing, and a non-rotating bellows surrounding the actuator and sealed to the housing and to the actuator adjacent the pivot, said bellows partaking of rocking movement with the actuator.

8. In apparatus of the character described, the combination of a pump housing; a compression chamber in the housing; displacement means in the chamber; and power transmitting means for the displacement means comprising a lever of the first class extending through the housing for actuating the displacement means, and a non-rotating bellows surrounding the lever and sealed to the housing and to the lever adjacent the fulcrum thereof, said bellows partaking of rocking movement with the lever.

In witness whereof I have signed this specification.

CLARENCE W. VOGT.